United States Patent
Karthaus

(10) Patent No.: US 9,126,511 B2
(45) Date of Patent: Sep. 8, 2015

(54) SELF-LOCKING STEP-BY-STEP MECHANISM FOR AN ADJUSTMENT DEVICE OF A VEHICLE SEAT

(75) Inventor: Ulrich Karthaus, Remscheid (DE)

(73) Assignee: C. ROB. HAMMERSTEIN GMBH & CO. KG, Solingen (DE)

(*) Notice: Subject to any disclaimer, the term of this patent is extended or adjusted under 35 U.S.C. 154(b) by 111 days.

(21) Appl. No.: 13/879,781

(22) PCT Filed: Oct. 25, 2011

(86) PCT No.: PCT/EP2011/068640
§ 371 (c)(1),
(2), (4) Date: Jul. 8, 2013

(87) PCT Pub. No.: WO2012/065814
PCT Pub. Date: May 24, 2012

(65) Prior Publication Data
US 2013/0270889 A1   Oct. 17, 2013

(30) Foreign Application Priority Data
Nov. 17, 2010 (DE) .......................... 10 2010 044 081

(51) Int. Cl.
| G05G 5/06 | (2006.01) |
| B60N 2/44 | (2006.01) |
| G05G 7/06 | (2006.01) |
| B60N 2/18 | (2006.01) |
| B60N 2/22 | (2006.01) |

(52) U.S. Cl.
CPC ................ B60N 2/4445 (2013.01); B60N 2/18 (2013.01); B60N 2/224 (2013.01); G05G 7/06 (2013.01)

(58) Field of Classification Search
USPC .................................. 74/527, 530; 297/463.1
See application file for complete search history.

(56) References Cited

U.S. PATENT DOCUMENTS

| 5,487,316 A * | 1/1996 | Hornung et al. ................. 74/527 |
| 6,065,374 A * | 5/2000 | Taggart .......................... 81/63.2 |
| 7,234,372 B2 * | 6/2007 | Hu .............................. 74/577 M |
| 7,390,061 B2 * | 6/2008 | Lange ........................... 297/362 |
| 2009/0184554 A1 | 7/2009 | Paing et al. |

FOREIGN PATENT DOCUMENTS

| DE | 43 44 225 A1 | 6/1995 |
| DE | 44 00 910 A1 | 7/1995 |
| DE | 19540631 A1 | 5/1997 |
| DE | 102010 31 133 | 8/2011 |
| DE | 102010 43 825 | 4/2012 |

OTHER PUBLICATIONS

International Search Report for International Application No. PCT/EP2011/068640, date of mailing Dec. 30, 2011, 4 pages.

* cited by examiner

*Primary Examiner* — Vicky Johnson
(74) *Attorney, Agent, or Firm* — Foley & Lardner LLP

(57) ABSTRACT

A self-locking step-by-step mechanism for an adjustment device of a vehicle seat has a clamping roller lock and a step-by-step device. The clamping roller lock a rotatable release wheel and a toothing. The step-by-step device has a) a pivotably mounted actuating lever, b) a driver pivotably mounted on the actuating lever and which has two driver regions which interact with the toothing of the release wheel, c) a drag lever which has supporting surfaces which enter into contact with the driver, and d) a spring. The spring has at least one projection. The drag lever has at least one indentation which is normally in engagement with the projection. The spring is fixed against rotating.

11 Claims, 7 Drawing Sheets

SELF-LOCKING STEP-BY-STEP MECHANISM FOR AN ADJUSTMENT DEVICE OF A VEHICLE SEAT

CROSS REFERENCE TO RELATED APPLICATIONS

The present application is a National Stage of International Application No. PCT/EP2011/068640 filed on Oct. 25, 2011, which claims the benefit of German Patent Application No. 10 2010 044 081.7 filed on Nov. 17, 2010, the entire disclosures of which are incorporated herein by reference.

The invention relates to a self-locking step-by-step switching mechanism for an adjustment device of a vehicle seat comprising a clamping roller lock and a step-by-step switching device, wherein the clamping roller lock comprises an axis and a release wheel that is rotatable about this axis and comprises a gearing, and the step-by-step switching device comprises a) an actuating lever mounted pivotably about the axis, b) a driver which is mounted on the actuating lever so as to be pivotable about a driver axis and which has two driver regions cooperating with the gearing of the release wheel, of which only one, respectively, is in engagement with the gearing in one direction of rotation of the release wheel, respectively, of which both are out of engagement with the gearing in a central position of the actuating lever, and of which one comes into engagement with the gearing and rotates the release wheel when the actuating lever is pivoted out of its central position, whereas the other remains out of engagement with the gearing, c) a drag lever comprising supporting surfaces that enter into contact with the driver, and d) a spring.

BACKGROUND

Such a self-locking step-by-step switching mechanism is known from DE 195 40 631 C2. The clamping roller lock used in this case is also referred to as a freewheel. Such clamping roller locks are known from DE 10 2010 43 825 and DE 10 2010 031 133. Other step-by-step switching mechanisms are known from DE 44 00 910 A1 and DE 43 44 225 A1.

SUMMARY

Occasionally, certain problems arise in the step-by-step switching mechanism of the type mentioned in the introduction. An undesired neutral stroke may occur. Another possible occurrence is that the driver does not properly come clear from the gearing of the release wheel after a working stroke.

Based on this, the invention has set itself the object of further developing the step-by-step switching mechanism of the type mentioned in the introduction in such a way that it functions more precisely, wherein particularly the lead-in movement of the driver and/or the lead-out movement of the driver is supposed to take place in a precise manner.

This object is accomplished by a self-locking step-by-step switching mechanism with the features of claim 1.

In this step-by-step switching mechanism, the drag lever does not move synchronously with the actuating lever. The drag lever is fixated in its normal position by the spring. It is only pivoted out of it when a sufficient torque that is above a threshold acts on the drag lever.

Starting from a central position of the actuating lever, the driver, at the beginning of a working stroke, is first pushed against the supporting surface of the drag lever which, in the actuation direction, is located at the front. If the driving movement is continued, the driver region situated, in the direction of rotation, at the front is pivoted into the gearing of the release wheel and comes into engagement with this gearing. Up to this point in time, the drag lever has not yet been moved out of its normal position; the drag lever has not yet moved.

If the drive is now continued further, the braking torque that the spring exerts on the drag lever can be overcome and the drag lever is taken along; the actuating lever thus drives the drag lever. This driving process takes place up to a predetermined angular position, for example 24°, which is defined by the designer.

At the beginning of an actuation, the driver undergoes a pivoting movement due to the actuating lever, which is made possible by the resting drag lever. The drag lever itself is at first held by the spring in its normal position, which is the central position, until the driver has pivoted completely into the gearing of the release wheel, which results in an increase of the counterforce. Now, the holding force of the spring can be overcome and the drag lever can rotate together with the actuating lever about the axis; the release wheel is driven thereby; a rotary movement on an output shaft of the clamping roller lock is produced.

Preferably, the spring has two projections, which are opposite from one another relative to the axis, and two associated indentations are provided on the drag lever, which are normally in engagement with the two projections. A reliable holding force on the drag lever is obtained by means of the two opposite spring loads. The two indentations are preferably situated on a single diameter. This diameter is preferably disposed at an angle of 90° relative to a radial extending through the driver axis. The larger the angle between this radial and the indentations, the larger the angle of the working stroke on the actuating lever can be.

In kinematic reversal, the spring can also have a indentation and the projection can be provided on the drag lever. The indentation can be made very small; it can also be omitted entirely.

In a preferred development, a tongue is provided which is located between the driver regions of the driver and the release wheel when the actuating lever is in its central position. In a preferred development, the tongue is a section of the spring. At the end of an actuation stroke and when returning the actuating lever, this tongue prevents the driver from being overridden. For it prevents the driver from pivoting in the opposite direction into the gearing of the release wheel. It thus prevents the other, so far passive, driver region from entering an active position. In that case, the actuating lever would get caught and would partially or completely return the stroke that was carried out just before. The tongue is located between the driver region and the gearing when the return of the actuating lever begins. Thus, the driver region cannot come into contact with the gearing. The tongue ends shortly before reaching the central position. The tongue frees the path of the driver without a pivoting into the gearing taking place. Preferably, the tongue is in approximately the same angular position as the driver axis, i.e. at 12 o'clock. The two indentations are preferably situated at 3 and 9 o'clock.

In another improvement, it is proposed that a braking tab is provided which rests in a dragging manner against the drag lever. Preferably, this tab is a section of the spring. This tab produces a frictional moment. It brakes the rotary movement of the drag lever. It thus prevents free rotatability of the drag lever. Due to the tab, the drag lever has to be transported until the central position is reached. Now, no noise is produced when the spring latches into the indentations. The elastic regions of the spring are deposited in the indentations in a positively guided manner. The indentations can have any shape; they can be configured as cut-outs. Preferably, the tab is situated diametrically opposite from the tongue and/or the driver axis. Preferably, the tab is situated at 6 o'clock.

Preferably, the drag lever has a recess in which the driver is located. Thus, the driver is arranged in a protected manner. In this case, the drag lever preferably has a wall which seals this recess on the side facing away from the actuating lever. Thus, the driver can be inserted into the recess only in an axial direction. Preferably, the recess is accessible only in one direction.

Preferably, the spring is connected to a base plate of the self-locking step-by-step switching mechanism and/or a housing of the clamping roller lock. In this way, the spring is non-rotatable. It does not move if the actuating lever is actuated. Preferably, the spring comprises a holding arm engaging an opening of the base plate. A positive-fit rotary connection is thus accomplished.

Independently of the characterizing feature of the claim 1, a special feature of the present invention lies in the fact that, based on the features of the preamble of the claim 1, no physically formed pivoting axis is provided between the drag lever and the driver. In the step-by-step switching mechanism according to DE 195 40 631 C2, such a real axis is provided. The consequence of this is that the drag lever always pivots synchronously with the actuating lever. If no physically formed pivoting axis is provided, the actuating lever, with the driver that is pivotably mounted thereon, can be pivoted over a small angular range without the drag lever also being pivoted. There is no pivot connection by a real pivoting axis between the actuating lever and the pivot lever. Thus, the lead-in movement of the driver can be separated from a rotation of the drag lever.

The applicant reserves the right to combine any features and sub-features from the claims and/or from sentences from the description with one another, even if such a combination is not expressly indicated. Any combination of different features and individual features, if mentioned in the application, are part of the content of the disclosure.

BRIEF DESCRIPTION OF THE SEVERAL VIEWS OF THE DRAWINGS

Other advantages and features of the invention become apparent from the other claims as well as from the following description of an exemplary embodiment of the invention, which shall be understood not to be limiting and which will be explained below with reference to the drawing. In the drawing:

DETAILED DESCRIPTION

Figure 1:
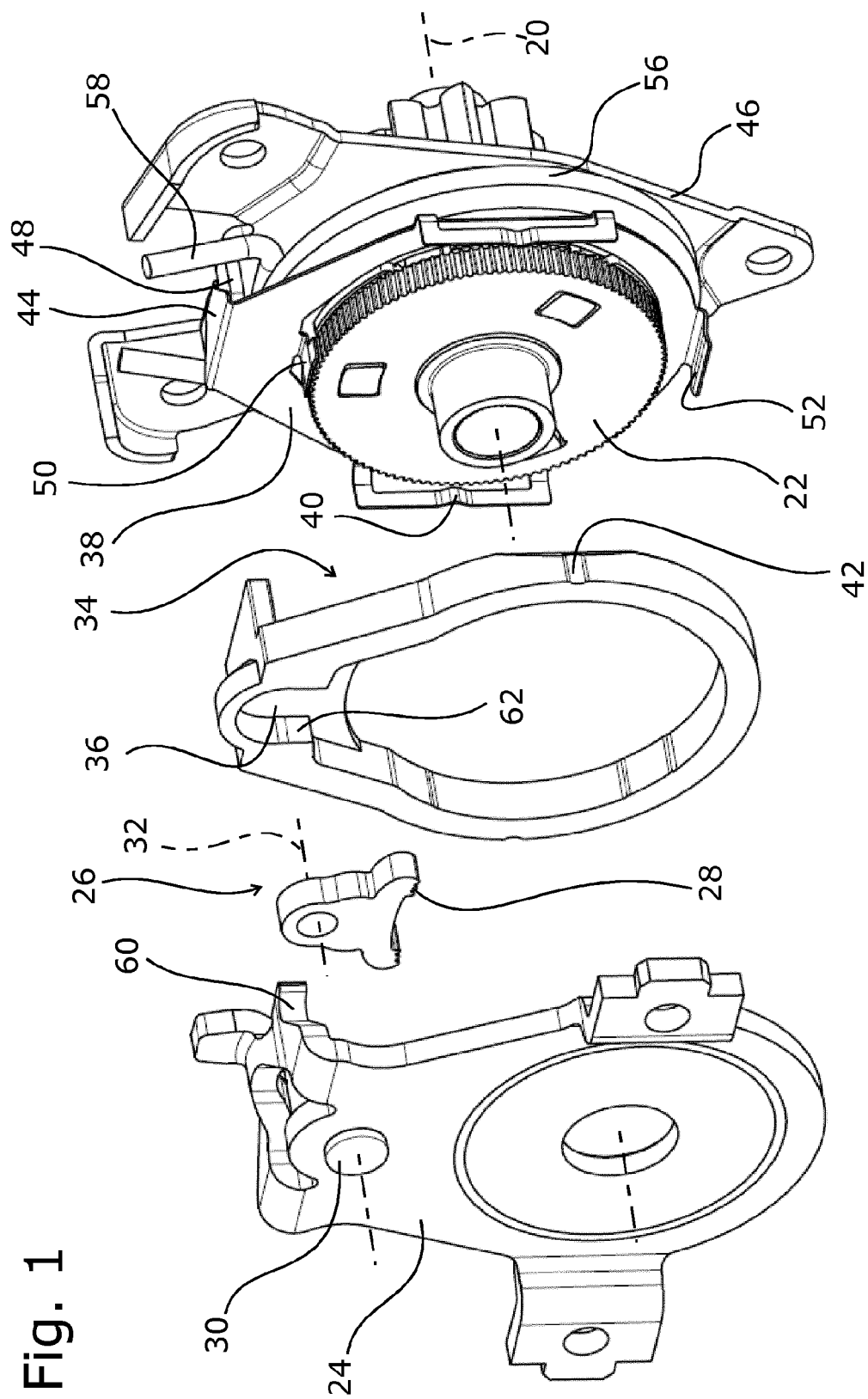
FIG. 1: shows a perspective assembly illustration of the self-locking step-by-step switching mechanism.
Figure 2:
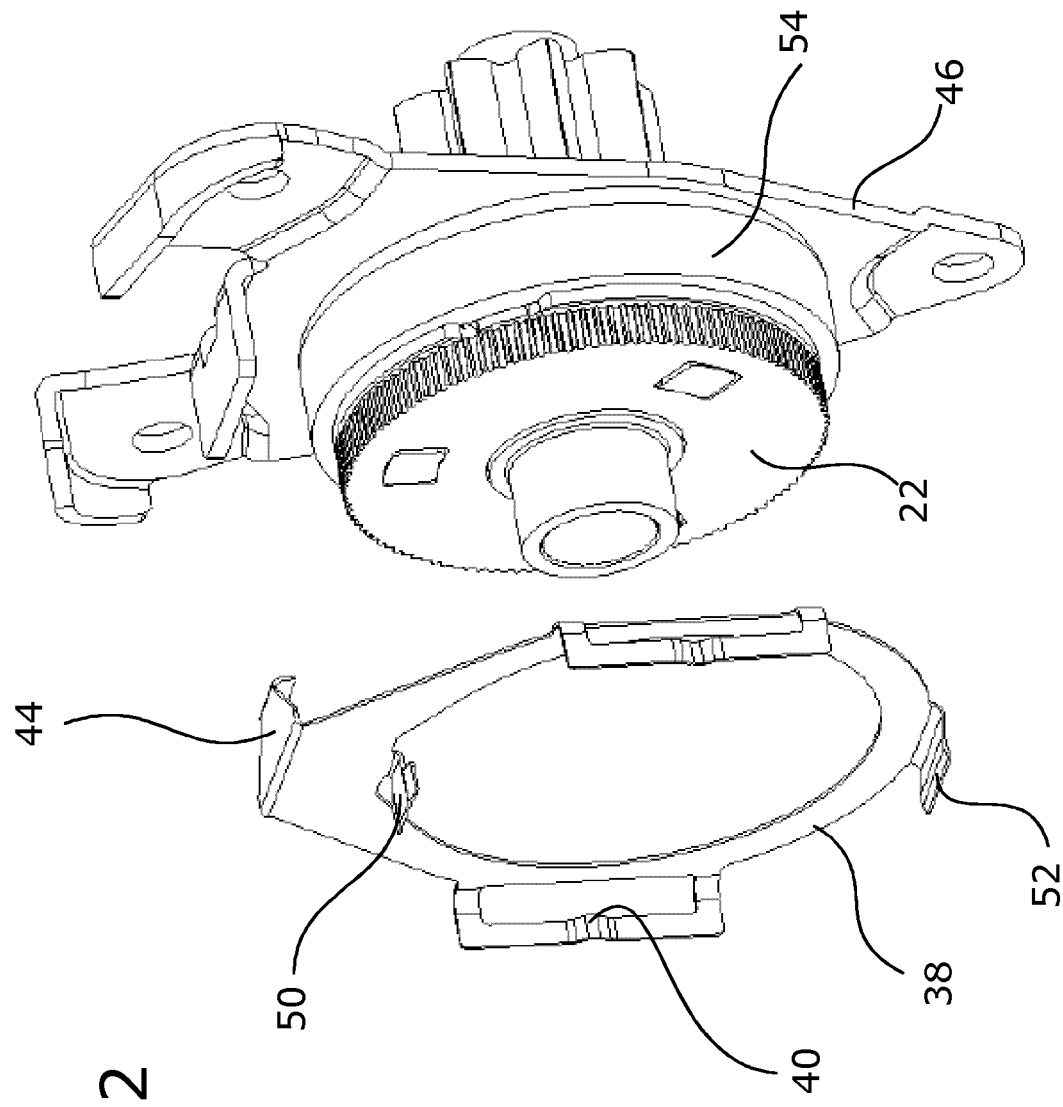
FIG. 2: shows a detail from FIG. 1, i.e. the right-hand assembly, with the spring and the zero-position spring removed.

The self-locking step-by-step switching mechanism is intended for an adjustment device of a vehicle seat. Such an adjustment device is, for example, the adjusting means for a backrest relative to a seat frame, the height adjusting means for a front edge of a seat relative to the seat frame or the adjusting means for a rear rocker of a base frame of a motor vehicle seat. Such adjustment devices are known to the person skilled in the art from the prior art.

The step-by-step switching mechanism comprises a clamping roller lock. This will not be discussed in detail below. A clamping roller lock is used as it is known from the two patent applications mentioned in the introduction. This clamping roller lock comprises an axis 20, which at the same time is the axis of the step-by-step switching mechanism. Furthermore, it comprises a release wheel 22. This is configured as a normal, externally toothed gear. It is rotatable about the axis 20.

The step-by-step switching mechanism moreover comprises a step-by-step switching device. The step-by-step switching device comprises an actuating lever 24, which is mounted so as to be pivotable about the axis 20. It comprises connecting means in order to connect it to a hand lever. A user grips such a hand lever, which is not shown, and initiates an actuating movement.

Furthermore, the step-by-step switching device comprises a driver 26. This comprises two driver regions 28, which are configured as gearings; they are directed towards the release wheel 22. The driver 26 comprises a bore through which an axis pin 30 reaches that is disposed on the actuating lever 24. It forms a driver axis 32 about which the driver 26 can pivot relative to the actuating lever 24.

In the known manner, in particular just like in the step-by-step switching device of the type mentioned in the introduction, only one of the two driver regions 28, respectively, is in engagement with the gearing of the release wheel 22 in one direction of rotation of the release wheel, i.e. in the case of a driving process. In the central position of the actuating lever 24, none of the two driver regions 28 is in engagement with the gearing. If the actuating lever 24 is pivoted starting from the central position, one of the two driver regions 28 comes into engagement with the gearing, the other remains out of engagement. Once the engagement has taken place, the release wheel 22 can be driven and rotated.

The step-by-step switching device moreover comprises a drag lever 34. It is preferably configured as a plastic part, whereas the other parts are formed as metal parts. The drag lever 34 is substantially annular. In the assembled state of the step-by-step switching device, it grasps around the release wheel 22 and is supported by it. The drag lever 34 has a recess 36 which accommodates the driver 26. In the assembled state, this recess 36 is covered by partial sections of the actuating lever 24. Thus, the driver 26 is fixed in the axial direction. It can be pulled free in a radially inward direction.

The step-by-step switching device moreover comprises a spring 38. In this specific exemplary embodiment, this spring 38 has a variety of tasks; it is a bent spring punched out from flat stock. The spring 38 has two projections 40. They are disposed a three o'clock and nine o'clock and are situated diametrically opposite from one another. They are formed by flat sheet metal strips which are connected to the main body of the spring 38 via an upper and a lower bridge. The sheet metal strips stand in a plane transverse to the main body; it is defined by the axes 20 and 32. The driver axis 32 is situated in the central position of the actuating lever in the 12 o'clock direction. In their central region, the sheet metal strips are bent out towards the release wheel 22; these bent-out portions form the projections 40. The projections 40 cooperate with indentations 42 that are provided in the same position on the outer shell of the drag lever 34.

The spring 38 comprises a holding arm 44 disposed in the 12 o'clock position. This holding arm 44 serves for the rotational fixation of the spring 38. The holding arm 44 comprises a lug that points downwards, towards the axis 20. It reaches into an opening of a base plate 46. This base plate 46 comprises an arm 48 located beneath the holding arm 44. The latter's function will be discussed below.

The spring 38 forms a tongue 50 located in the 12 o'clock position. The tongue 50 is substantially rectangular; it reaches freely over the gearing of the release wheel 22 over a small angle range, for example 1 to 8°. In the assembled state of the step-by-step switching device, it is located, viewed radially, between the gearing of the release wheel 22 and the driver 26. The tongue 50 protrudes transversely from the main body of the spring 38.

The spring 38 has a braking tab 52, which, similar to the tongue 50, axially protrudes transversely from the main body of the spring 38. The tab 52 is disposed in the 6 o'clock position. It rests in a dragging manner on the outer shell of the drag lever 34 and causes a braking torque.

The base plate 46 is connected to a housing 54 of the clamping roller lock. This housing 54 is located between the base plate 46 and the spring 38. The spring 38 is located between the housing 54 and the release wheel 22; only parts of it are located in the plane of the release wheel.

The step-by-step switching device moreover comprises a zero-position spring 56. It is configured as a leg spring. It has two windings and two legs 58. The legs 58 substantially protrude radially outwards. One leg 58 is located in a position between twelve and one o'clock, the other leg 58 is located in a position between eleven and twelve o'clock. In the assembled state, these legs 58 rests resiliently against holding indentations 60 formed by the actuating lever 24. Specifically, they are formed in a transverse part of the actuating lever 24 which, in the assembled state, reaches over the holding arm 44 of the spring 38. The arm 48 is located between the two legs 58.

The driver 26 is displaceable within the recess 36 of the drag lever 34. No physical axis is provided about which the driver 26 is pivotable relative to the drag lever 34. Thus, this is a difference to the prior art of the kind mentioned in the introduction.

Opposing supporting surfaces 62 are provided the recess 36; the driver 26 can come into contact with them. The contact takes place on corresponding counter surfaces of the driver 26. In the central position of the actuating lever 24, a small amount of play may be present between the supporting surface 62 and the associated counter surface of the driver 26 on both sides. However, this play can also be very small, it has to be just sufficient for assembly. As can be seen from FIG. 3, in particular, the counter surfaces are configured in a partially cylindrical or ball-like shape. The recess 36 is generally configured in a step-shape; the supporting surfaces 62 are located on opposite steps.

The zero-position spring 56 is manufactured from spring wire. It has an annular portion formed by two windings. This annular portion grasps around the housing 54 of the clamping roller lock. The zero-position spring 56 is fixated by its legs 58 resting, as described, in the holding indentations 60 and the grasp around the housing 54. When the actuating lever 24 is deflected from the central position shown in FIG. 3, the leg 58 present in the direction of rotation is also moved. The zero-position spring 56 is tightened. In the process, the other leg 58 braces itself on the arm 48.

Figure 3:
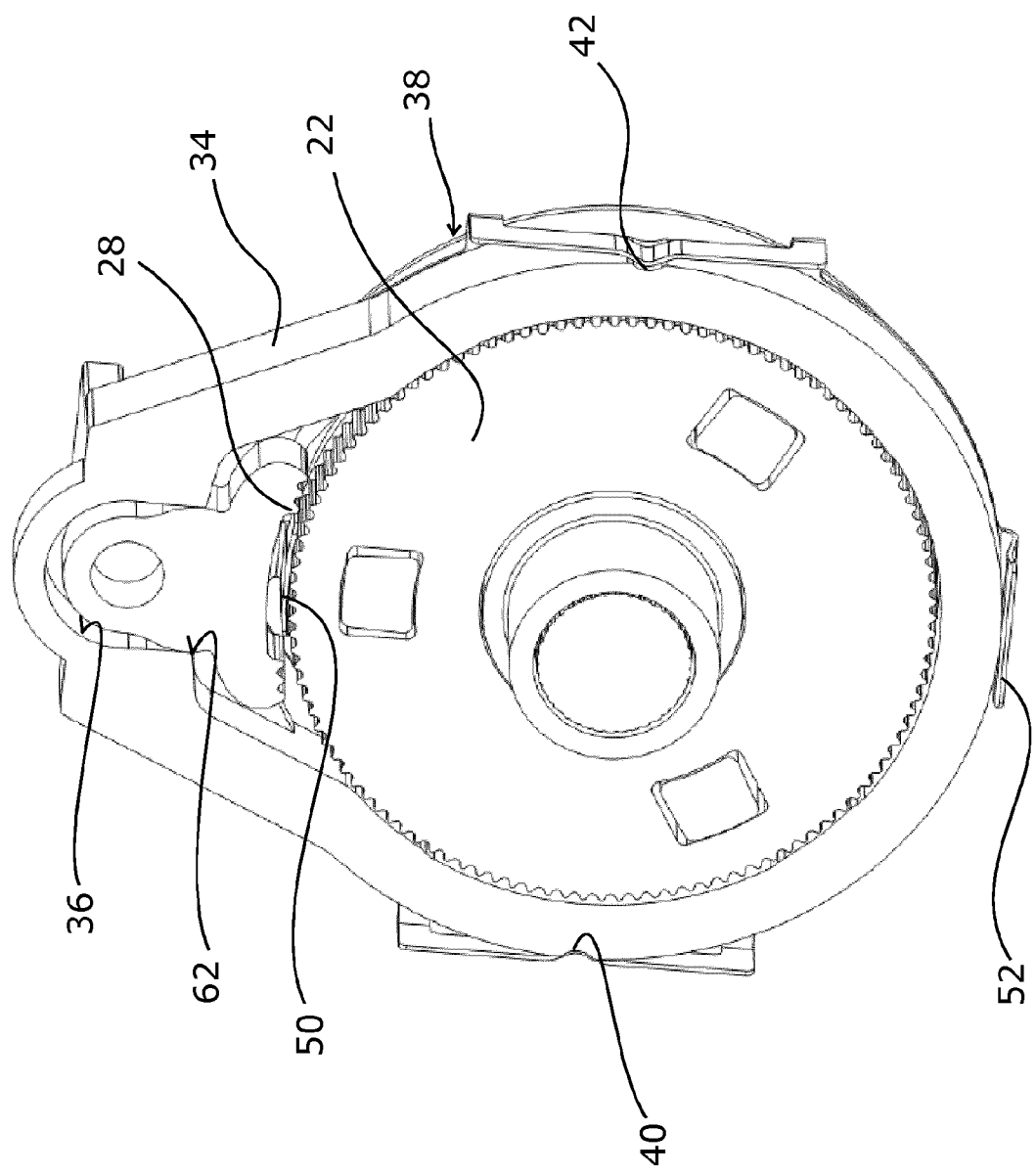
FIG. 3: shows a perspective front view of the components as they are shown in FIG. 1, but without the actuating lever, in the assembled state, in the initial position.

FIG. 3 shows the initial position. The assembly shown, apart from the three coupling sections for the release wheel 22, is axially symmetrical to a plane defined by the axis 20 and the driver axis 32. The two driver regions 28 are not in engagement with the gearing of the release wheel 22. The tongue 50, viewed radially, is located between the driver 26 and the gearing of the release wheel 22. Seen in the circumferential direction, the tongue 50 is located between the two driver regions 28.

Figure 4:
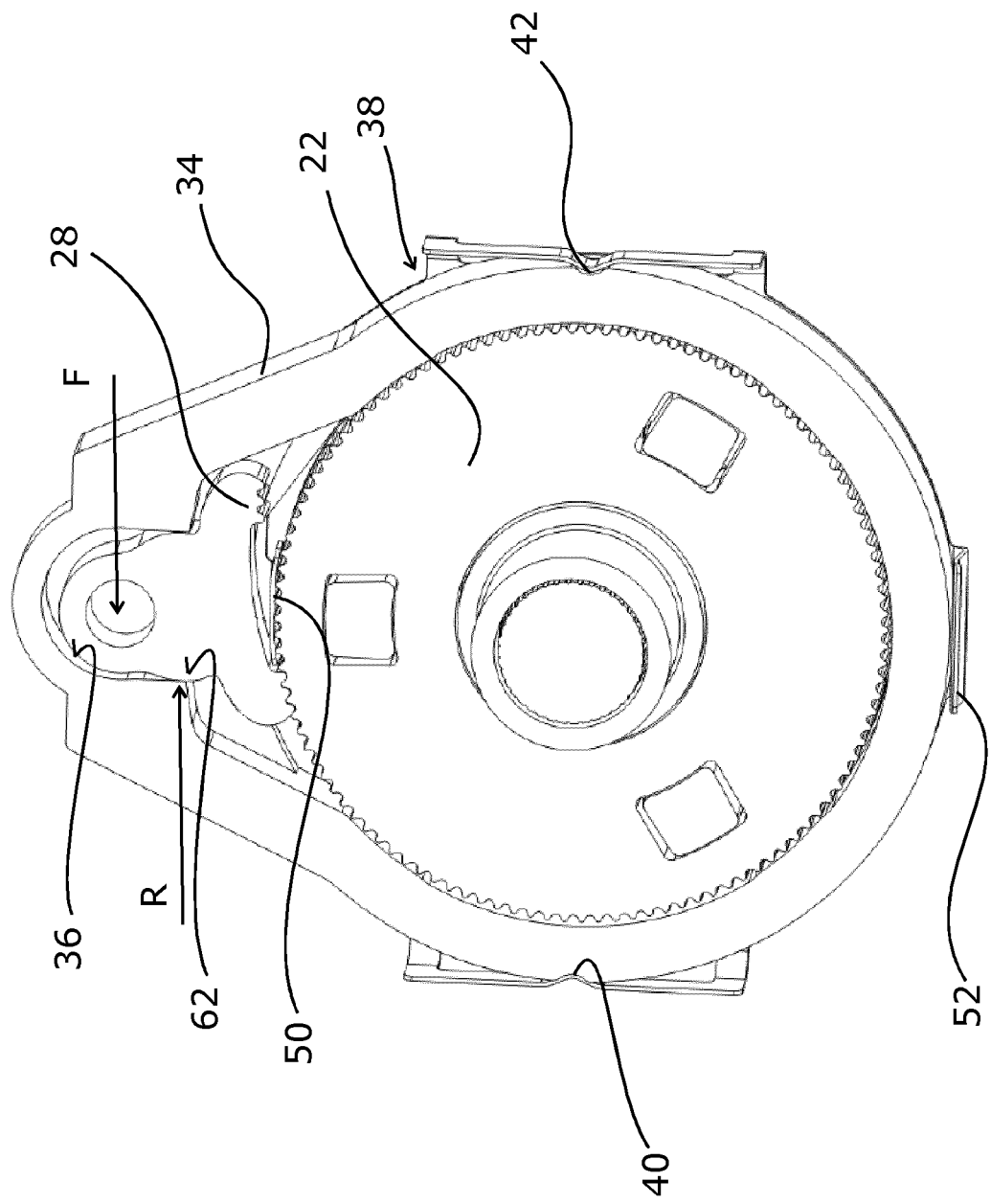
FIG. 4: shows the arrangement according to FIG. 3, in the engaged state of the driver.

The illustration according to FIG. 4 shows the state of the left-hand driver region 28 latching into the gearing of the release wheel 22. Starting from the initial position according to FIG. 3, which shows the central position, a force F, which is introduced via the actuating lever 24, acts on the driver 26. It causes the driver 26 to pivot towards the left. Thus, its left counter surface comes into contact with the corresponding supporting surface 62; a reaction force R is produced there. Both forces F and R cause the driver 26 to tilt in a generally counter-clockwise direction and thus cause the left driver region 28 to come into engagement with the gearing; this engagement is shown in FIG. 4. It is apparent in FIG. 4 that the projections 40 are in engagement with the respective indentation 42.

Figure 5:
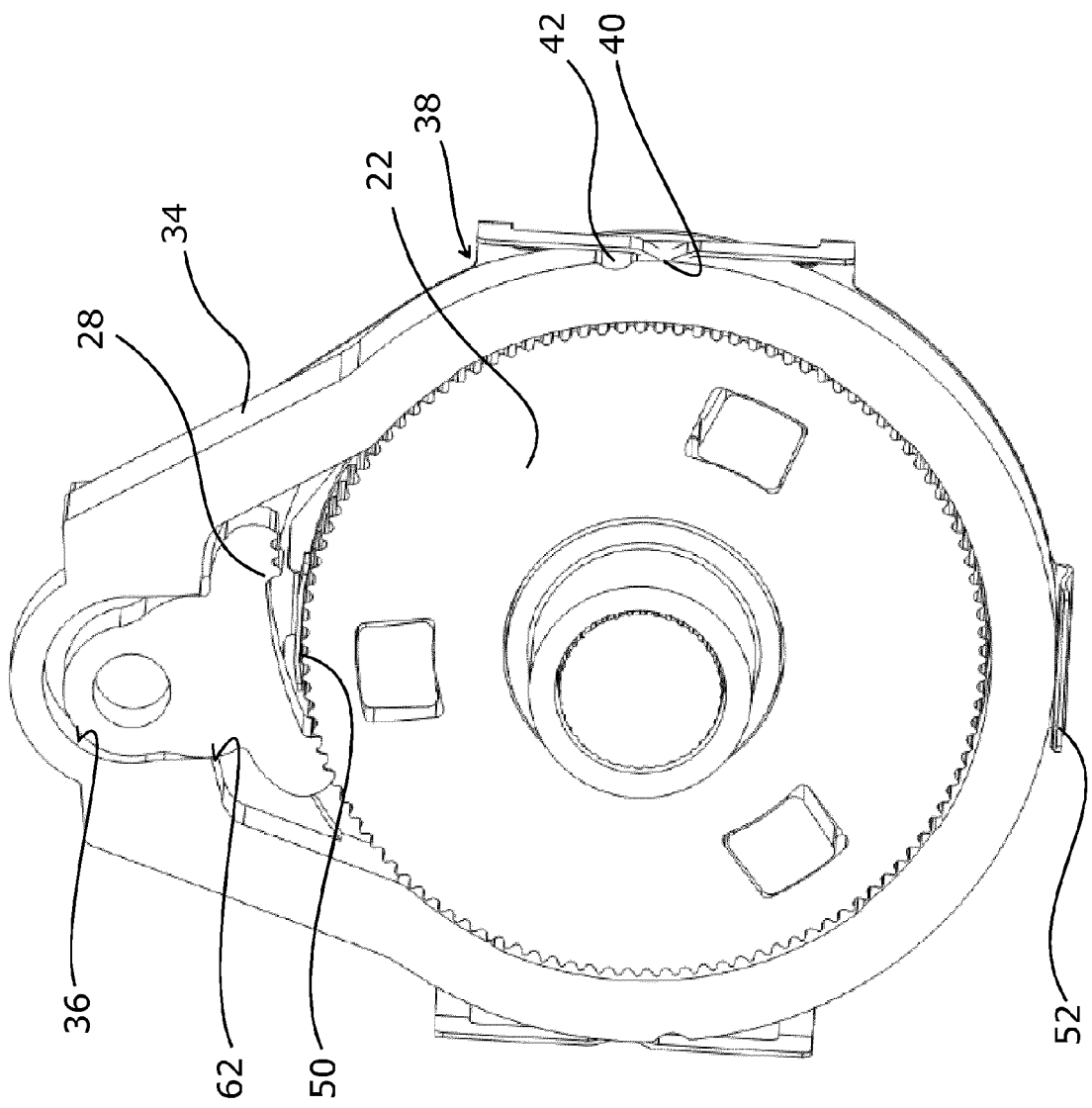
FIG. 5: shows the arrangement as in FIG. 3, but at the start of the release wheel being driven.

FIG. 5 shows an intermediate position during the actual drive of the release wheel 22. Now, the drag lever 34 is also rotated about the axis 20 in the counter-clockwise direction. The two indentations 42 are now free from the projections 40.

Figure 6:
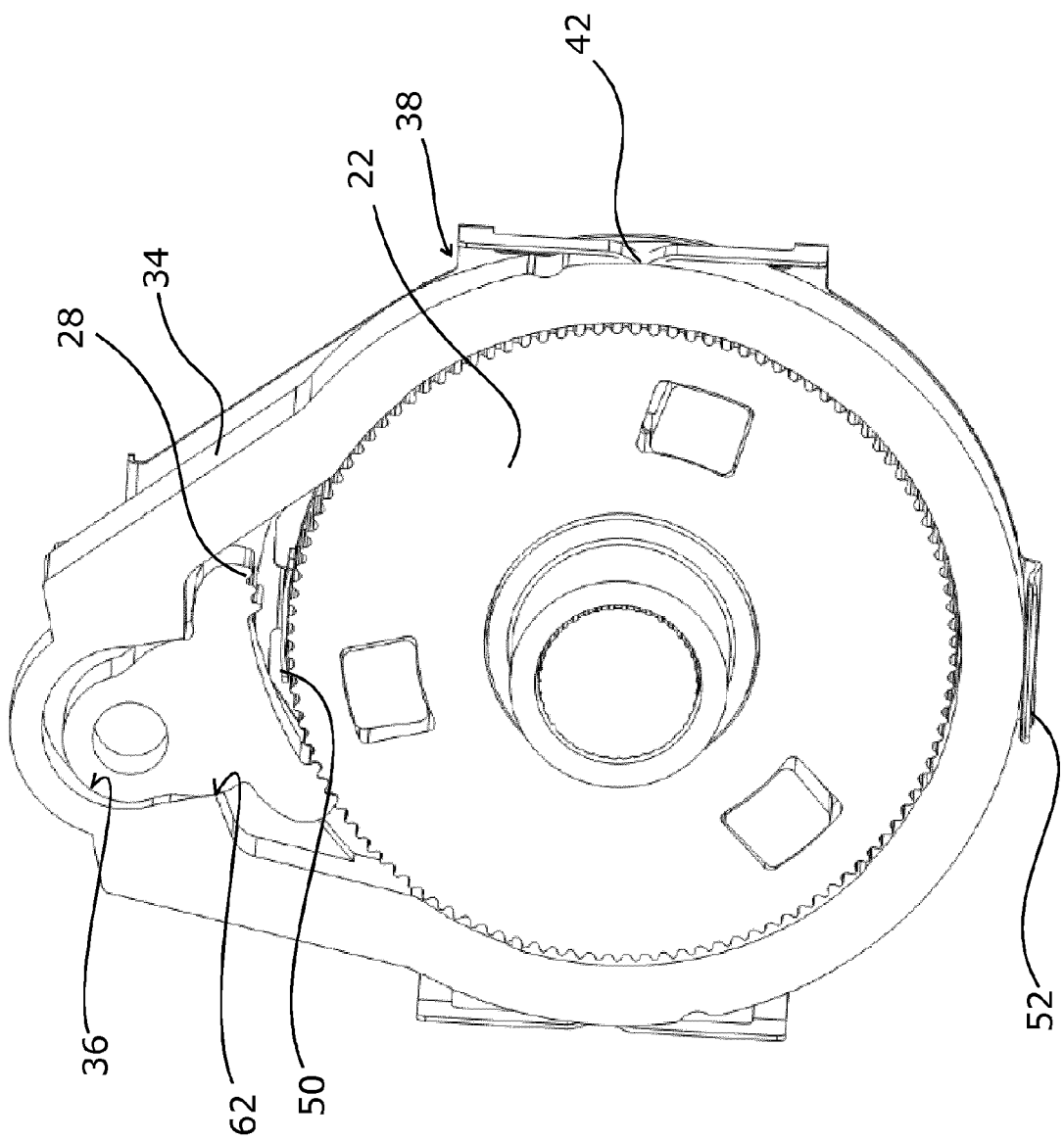
FIG. 6: shows the illustration as in FIG. 3, but at the end of the actuating stroke.

FIG. 6 shows the end state of the actuation stroke. This is limited by a stop for the actuating lever 24 which is not shown here. The state is as in FIG. 5, but the indentation 42 has distanced itself even more from the projection 40 on each side.

Figure 7:
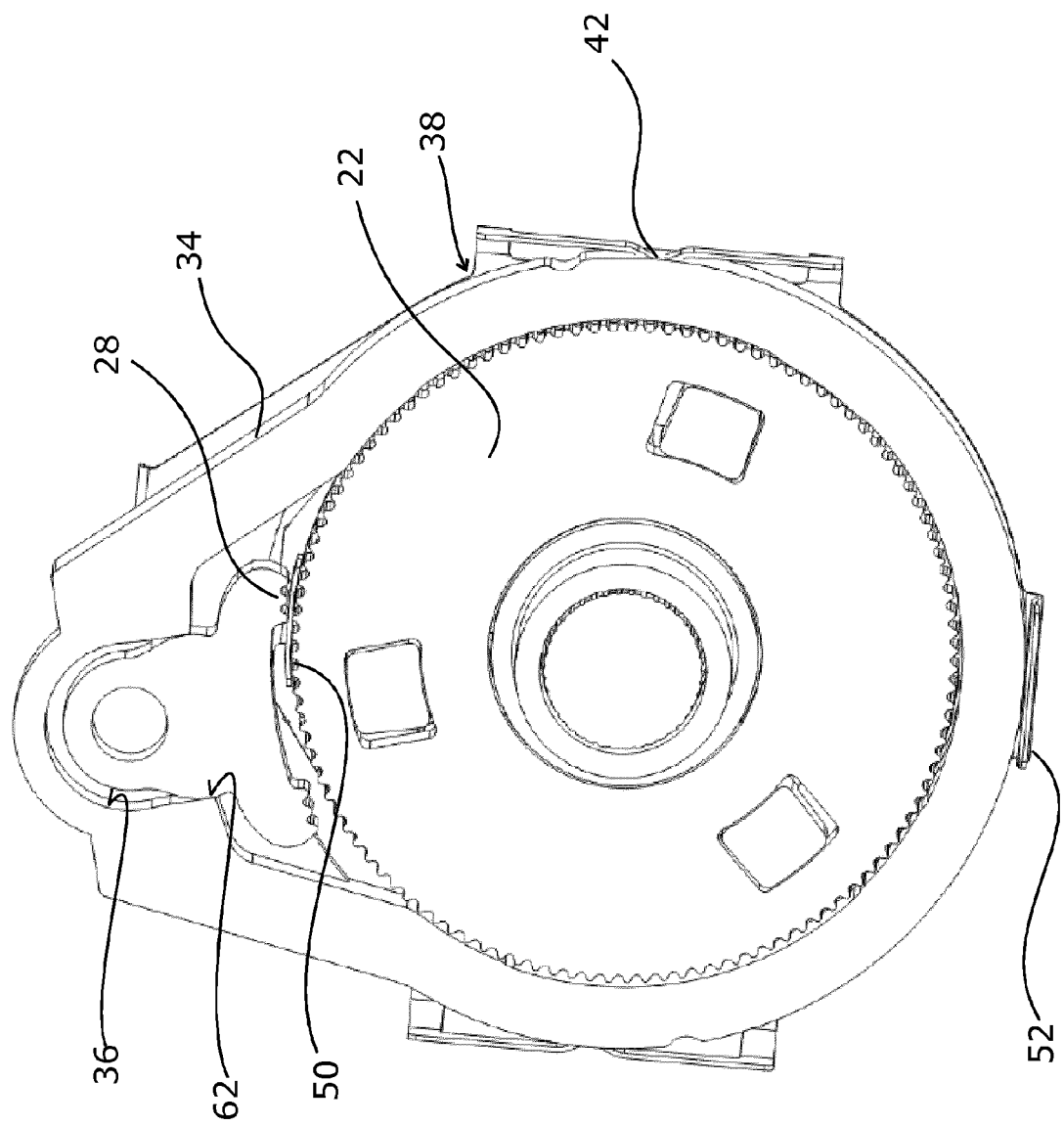
FIG. 7: shows the illustration as in FIG. 3, but during a return stroke.

FIG. 7 shows the beginning return stroke, starting from the position according to FIG. 6. As the pivoting movement of the actuating lever in the opposite direction, i.e. now in the clockwise direction, is initiated, the other supporting surface 62 of the recess 36 comes into contact with its associated counter surface on the driver 26, so that the latter is pivoted in the opposite direction and its previously driving driver region 28 gets out of engagement with the gearing. In order for the other driver region 28 not to be led into the engagement, the tongue 50 is provided, which is now located beneath the other engagement region. It forms a kind of protection and prevents the engagement of the other engagement region. This impediment lasts for so long until the initial position according to FIG. 3 has been reached again.

The invention claimed is:

1. A self-locking step-by-step switching mechanism for an adjustment device of a vehicle seat comprising:
   a clamping roller lock; and
   a step-by-step switching device,
   wherein the clamping roller lock comprises an axis and a release wheel that is rotatable about this axis and comprises a gearing, and
   wherein the step-by-step switching device comprises
   a) an actuating lever mounted pivotably about the axis,
   b) a driver which is mounted on the actuating lever so as to be pivotable about a driver axis and which has two driver regions cooperating with the gearing of the release wheel, of which only one, respectively, is in engagement with the gearing in one direction of rotation of the release wheel, respectively, of which both are out of engagement with the gearing in a central position of the actuating lever, and of which one comes into engagement with the gearing and rotates the release wheel when the actuating lever is pivoted out of its central position, whereas the other remains out of engagement with the gearing,
   c) a drag lever comprising supporting surfaces that enter into contact with the driver, d) a zero-position spring arranged on the actuating lever, and e) a spring, wherein the spring comprises at least one projection, the drag lever comprises at least one indentation which is normally in engagement with the projection, and the spring is fixed against rotation.

2. The self-locking step-by-step switching mechanism according to claim 1, wherein the spring has two projections, which are opposite from one another relative to the axis, and the drag lever comprises two indentations, which are normally in engagement with the two projections.

3. The self-locking step-by-step switching mechanism according to claim 1, wherein a tongue is provided which is located between the driver regions of the driver and the release wheel when the actuating lever is in its central position.

4. The self-locking step-by-step switching mechanism according to claim 1, wherein a braking tab is provided which rests against the drag lever.

5. The self-locking step-by-step switching mechanism according to claim 1, wherein the drag lever has a recess in which the driver is located.

6. The self-locking step-by-step switching mechanism according to claim 5, wherein the release wheel is located within the recess and the actuating lever covers the recess in the axial direction.

7. The self-locking step-by-step switching mechanism according to claim 6, wherein structure forming a pivoting axis is not provided between the drag lever and the driver, such that the actuating lever can be pivoted over at least some angular range without the drag lever also being pivoted.

8. The self-locking step-by-step switching mechanism according to claim 1, comprising a base plate, and the base plate is connected to a housing of the clamping roller lock.

9. The self-locking step-by-step switching mechanism according to claim 8, wherein the spring is connected to the base plate and/or the housing of the clamping roller lock.

10. The self-locking step-by-step switching mechanism according to claim 8, wherein the zero-position spring comprises an annular portion and two legs, the housing of the clamping roller lock is located between the two legs, and the legs rest, under an elastic bias, against a cantilever of the actuating lever and/or an arm of the drag lever.

11. A self-locking step-by-step switching mechanism for an adjustment device of a vehicle seat comprising:

a clamping roller lock; and a step-by-step switching device, wherein the clamping roller lock comprises an axis and a release wheel that is rotatable about this axis and comprises a gearing, and wherein the step-by-step switching device comprises a) an actuating lever mounted pivotably about the axis, b) a driver which is mounted on the actuating lever so as to be pivotable about a driver axis and which has two driver regions cooperating with the gearing of the release wheel, of which only one, respectively, is in engagement with the gearing in one direction of rotation of the release wheel, respectively, of which both are out of engagement with the gearing in a central position of the actuating lever, and of which one comes into engagement with the gearing and rotates the release wheel when the actuating lever is pivoted out of its central position, whereas the other remains out of engagement with the gearing, c) a drag lever comprising supporting surfaces that enter into contact with the driver, d) a zero-position spring arranged on the actuating lever, and e) a spring, wherein the spring comprises at least one projection, the drag lever comprises at least one indentation which is normally in engagement with the projection, and the spring is fixed against rotation, wherein the zero position spring comprises an annular portion and two legs and the legs rest, under an elastic bias, against a cantilever of the actuating lever and/or an arm of the drag lever.

* * * * *